United States Patent
Korapati et al.

(10) Patent No.: US 10,365,764 B2
(45) Date of Patent: Jul. 30, 2019

(54) WATER REJECTION FOR CAPACITIVE TOUCH SCREEN

(71) Applicant: STMicroelectronics Asia Pacific Pte Ltd, Singapore (SG)

(72) Inventors: Lokesh Kumar Korapati, Singapore (SG); Manivannan Ponnarasu, Singapore (SG); Mythreyi Nagarajan, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 309 days.

(21) Appl. No.: 15/207,105

(22) Filed: Jul. 11, 2016

(65) Prior Publication Data

US 2018/0011596 A1 Jan. 11, 2018

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 2203/04104* (2013.01)

(58) Field of Classification Search
CPC .................. G06F 3/0418; G06F 3/044; G06F 2203/04104
USPC ........................................................ 345/174
See application file for complete search history.

(56) References Cited

U.S. PATENT DOCUMENTS

| | | | |
|---|---|---|---|
| 8,564,564 B2 | 10/2013 | Chang et al. | |
| 8,717,331 B2 | 5/2014 | Kremin et al. | |
| 8,773,146 B1 | 7/2014 | Hills et al. | |
| 8,982,097 B1* | 3/2015 | Kuzo | G06F 3/0418 345/174 |
| 2013/0278543 A1 | 10/2013 | Hsu et al. | |
| 2014/0204058 A1* | 7/2014 | Huang | G06F 3/044 345/174 |
| 2014/0306924 A1 | 10/2014 | Lin et al. | |
| 2015/0015539 A1* | 1/2015 | Fotopoulos | G06F 3/044 345/174 |
| 2015/0049043 A1 | 2/2015 | Yousefpor | |

OTHER PUBLICATIONS

Anderson, Erik: "Design How-to: The Basics of Waterproofing Capacitive Touchscreens," EE Times, Jun. 6, 2012 (7 pages).

* cited by examiner

*Primary Examiner* — Amare Mengistu
*Assistant Examiner* — Gloryvid Figueroa-Gibson
(74) *Attorney, Agent, or Firm* — Crowe & Dunlevy (57) ABSTRACT

A method of foreign matter rejection for multi-touch capacitive touch screens includes performing touch detection in both self-capacitance mode and mutual capacitance mode. By combining information from both modes, a distinction is identified between wanted touches, such as by a finger or stylus, and unwanted touches such as by foreign matter.

19 Claims, 4 Drawing Sheets

WATER REJECTION FOR CAPACITIVE TOUCH SCREEN

FIELD OF THE INVENTION

The present disclosure generally relates to capacitive touchscreen panels and, more particularly, to a system and method for water rejection for use in a capacitive touchscreen panel.

BACKGROUND

Touchscreen panels are typically incorporated in various electronic devices to detect a user input (i.e., user touch or hover) and to display content. The touchscreen panels include an active portion capable of detecting the user input and displaying content. This active portion is typically formed from a display panel on top of which a capacitive sensing panel is provided which includes multiple layers of capacitive sensing circuitry arranged in a pattern.

A capacitive sensing panel may be provided in a touchscreen panel for an electronic device such as a smart phone, GPS device, tablet computer, mobile media player, remote control device, or any other device capable of using a touchscreen panel. The sensing panel includes a patterned array of conductive features arranged in an overlapping configuration. For instance, the patterned array of conductive features may include sets of overlapping lines, conductive pads, interleaved structures, diamond structures, lattice structures, and the like. The overlapping conductive features form capacitive nodes at various points of overlap and/or the conductive features form capacitive nodes between each of the features and a circuit ground. The capacitive sensing panel evaluates changes in capacitance at each capacitive node to detect a user touch or hover, such as by a finger or other body part as well as by a tool such as a stylus.

SUMMARY

A method of foreign matter rejection for a capacitive touch screen is disclosed. The method may include performing touch detection in a mutual capacitance mode to identify mutual capacitance touched nodes, creating a first mutual capacitance island including at least one adjacent mutual capacitance touched nodes that have mutual capacitance strengths greater than a first mutual capacitance strength detection threshold, and creating a first mutual capacitance expanded boundary layer including at least one touched node that has mutual capacitance strength less than a second mutual capacitance strength detection threshold. The method may also include calculating an inner mutual capacitance aggregate positive sum including a sum of the mutual capacitance strengths of the mutual capacitance island that are greater than zero and, in response to the inner mutual capacitance aggregate positive sum not exceeding a first aggregate sum threshold, performing steps. The steps may include calculating an expanded mutual capacitance aggregate positive sum including a sum of the inner mutual capacitance aggregate positive sum and every mutual capacitance strength of the first mutual capacitance expanded boundary layer that is greater than zero and calculating an expanded mutual capacitance aggregate negative sum including a sum of each mutual capacitance strength of the mutual capacitance touched nodes of the first mutual capacitance expanded boundary layer that is less than zero and each mutual capacitance strength of each mutual capacitance touched node of the mutual capacitance island that is less than zero. The steps may also include computing a ratio of the expanded mutual capacitance aggregate positive sum to the expanded mutual capacitance aggregate negative sum, and rejecting the mutual capacitance island as not being a valid touch in response to the ratio being less than a first ratio threshold.

A method of foreign matter rejection for multi-touch capacitive touch screens may include performing touch detection in a self-capacitance mode, wherein self-capacitance mode touched nodes are identified and a self-capacitance window bounded by a first self-capacitance node axis and a second self-capacitance node axis characterized by outermost self-capacitance mode touched nodes along each axis, is formed. The method may include performing touch detection in a mutual capacitance mode, wherein mutual-capacitance touched nodes are identified, and determining a first coincidence of mutual capacitance mode touched nodes and self-capacitance mode touched nodes. The method may include, in response to the first coincidence not including a null set, performing steps including forming a first mutual-capacitance touch island including adjacent mutual capacitance touched nodes having mutual capacitance strengths greater than a first mutual capacitance strength detection threshold and positioned outside the self-capacitance window, and forming a second mutual-capacitance touch island including adjacent capacitance touched nodes having mutual capacitance strengths greater than the first mutual capacitance strength detection threshold and positioned inside the self-capacitance window.

A method of foreign matter rejection for a capacitive touch screen may include performing touch detection in a first mode selected from a first set including a mutual capacitance mode and a self-capacitance mode, and performing touch detection in a second mode selected from the first set and different from the first mode. The method may include determining a first coincidence of mutual capacitance mode touched nodes detected in the mutual capacitance mode and self-capacitance mode touched nodes detected in the self-capacitance mode. The method may include, in response to the first coincidence not including a null set, performing steps including determining a mutual capacitance strength of each mutual capacitance mode touched node, and creating a mutual capacitance island including adjacent mutual capacitance touched nodes having mutual capacitance strengths greater than a first mutual capacitance strength detection threshold. The steps may include creating a mutual capacitance expanded boundary layer including mutual capacitance touched nodes adjacent to an edge of the mutual capacitance island and having mutual capacitance strengths less than a second mutual capacitance strength detection threshold, and calculating an inner mutual capacitance aggregate positive sum including the sum of the mutual capacitance strengths of mutual capacitance touched nodes of the mutual capacitance island that are greater than zero.

BRIEF DESCRIPTION OF DRAWINGS

The foregoing and other features and advantages of the present disclosure will become further apparent from the following detailed description of the embodiments, read in conjunction with the accompanying drawings. The detailed description and drawings are merely illustrative of the disclosure, rather than limiting the scope of the invention as defined by the appended claims and equivalents thereof.

Embodiments are illustrated by way of example in the accompanying figures not necessarily drawn to scale, in which like numbers indicate similar parts, and in which.

DETAILED DESCRIPTION OF THE DRAWINGS

Figure 1:
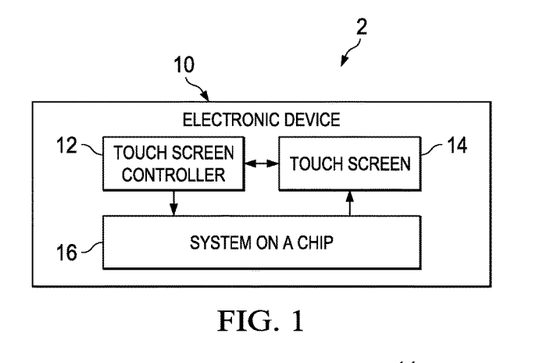
FIG. 1 illustrates an electronic device having a multi-touch capacitive touch screen configured to receive user input, in accordance with various embodiments.

With reference to FIG. 1, an electronic device 2 comprises any device configured to receive user input. For example, an electronic device 2 may comprise a smart phone, a GPS device, a tablet computer, a mobile media player, a remote control device, or any other device as desired. The electronic device 2 further comprises a touch sensitive interface system 10. A touch sensitive interface system 10 is configured to accept user input via touching such as from the user's body and/or a tool such as a stylus. The touch sensitive interface system 10 also provides output, such as by a human-readable display.

More specifically, the touch sensitive interface system 10 comprises a multi-touch capacitive touch screen 14, a touch screen controller 12, and a system on a chip 16. The system on a chip 16 may comprise a processor, interface, circuitry, and/or the like configured to direct the flow of input and output data to a multi-touch capacitive touch screen 14 and an associated touch screen controller 12. A touch screen controller 12 is configured to be in logical communication with the system on a chip 16. The touch screen controller 12 comprises a processor and a memory in logical communication with the multi-touch capacitive touch screen 14. The touch screen controller 12 may perform various methods with respect to the multi-touch capacitive touch screen 14 as discussed further herein, such as with reference to FIGS. 3, 4A, and 4B and the associated discussion below.

Figure 2:
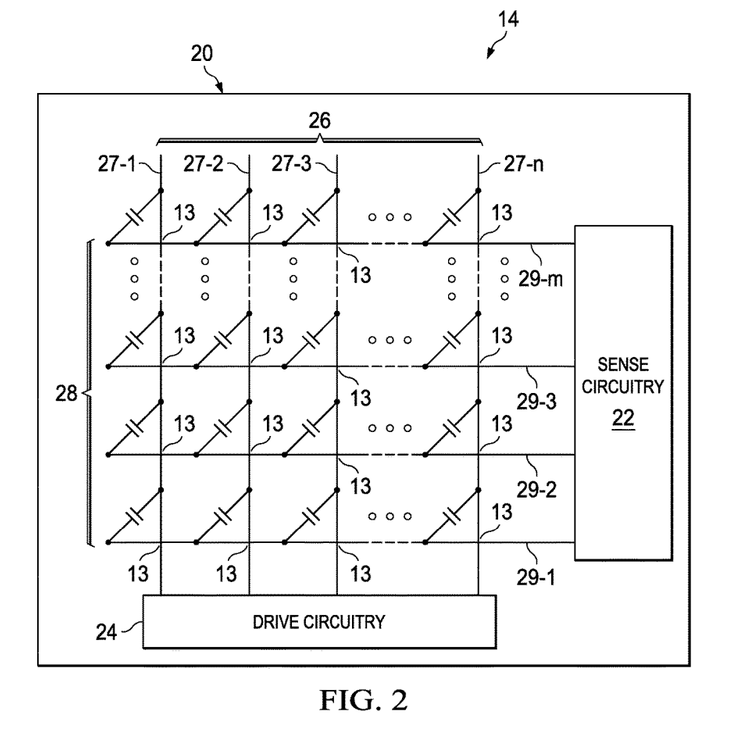
FIG. 2 illustrates a capacitive sensing panel of the multi-touch capacitive touch screen, in accordance with various embodiments.

With reference to FIGS. 1 and 2, a multi-touch capacitive touch screen 14 includes a capacitive sensing panel 20. The capacitive sensing panel 20 includes a drive array 26 and a sense array 28 operable by a touch screen controller 12 in a mutual capacitance mode and a self-capacitance mode. A drive array 26 comprises an array of conductive features arranged in a matrix with respect to the sense array 28. Similarly, the sense array 28 comprises an array of conductive features arranged in a matrix with respect to the drive array 26. For example, the drive array 26 comprises a first drive line 27-1, a second drive line 27-2, a third drive line 27-3, and any number n of drive lines, such as including an $n^{th}$ drive line 27-n. In like manner, the sense array 28 comprises a first sense line 29-1, a second sense line 29-2, a third sense line 29-3, and any number m of sense lines, such as including an $m^{th}$ sense line 29-m. In various embodiments, an equal number of sense lines 29 and drive lines 27 exist, whereas in further embodiments, the number of sense lines 29 and drive lines 27 differ. Moreover, the touch screen controller 12 may repurpose various sense lines 29 to function as drive lines 27, and various drive lines 27 to function as sense lines 29, from time to time. For example, during a self-capacitance mode discussed below, one or more drive lines 27 or sense lines 29 may perform both drive and sense functions, for instance, a drive line 27 may also serve as a sense line 29 so that self-capacitance (rather than mutual capacitance) is monitored.

The drive array 26 and the sense array 28 may overlap. While FIG. 2 depicts the drive lines 27 of the drive array 26 overlapping the sense lines 29 of the sense array 28 orthogonally, one may appreciate that other shapes than lines may be implemented, and the shapes may overlap other than orthogonally, for instance, such as being interleaved, or at various angles, or otherwise, as desired.

The drive array 26 is connected to drive circuitry 24. The drive circuitry 24 excites one or more drive lines of the drive array 26 such as with an electrical waveform. The sense array 28 is connected to sense circuitry 22. The sense circuitry 22 detects induced voltage and/or current perturbations on one or more sense lines of the sense array 28 that may be induced in response to the electrical waveform on the drive array 26 and/or further in response to external influences such as the presence of a finger, stylus, or unwanted material such as water. In various embodiments, these perturbations arise from capacitive interaction between the drive array 26, the sense array 28, and/or proximate objects such as a finger or stylus that is interacting with the multi-touch capacitive touch screen 14. As such, one may say that the drive array 26 and sense array 28 share "nodes," wherein a node 13 arises at each intersection of a sense line 29 or drive line 27 with a drive line 27 or sense line 29, respectively. In various embodiments, such an arrangement facilitates operation in a mutual capacitance mode discussed below.

Furthermore, the drive array 26 and sense array 28 may operate independently so that a single node 13 arises between a drive line 27 and/or sense line 29 and a circuit ground, rather than nodes 13 corresponding to intersections of drive lines 27 of the drive array 26 and sense lines 29 of the sense array 28. For instance, the drive array 26 is connected to drive circuitry 24 and has one or more drive lines 27 excited by the drive circuitry 24 with an electrical waveform. The drive array 26 may also serve as a sense array 28, thus having a dual purpose. Induced voltage and/or current perturbations may arise on a drive line 27 as a result of the presence of a finger, stylus, or unwanted material such as water, parasitically sinking current from the drive line 27 to a ground. Thus, each drive line 27 of the drive array 26 may be considered to be a single node 13, as may each sense line 29 of the sense array 28. Stated another way, each line may be conceptualized as having multiple nodes, as is the case when the mutual capacitance mode is implemented, but every node of the line may be considered equipotential with every other node of the line, so that the line is effectively a single node. While the drive lines array 26 and sense array 28 are depicted as separate arrays of orthogonal lines in FIG. 2, one may appreciate that the drive array 26 may be its own sense array 28, and vice-versa. In various embodiments, such an arrangement facilitates operation in a self-capacitance mode.

As briefly mentioned, a capacitive sensing panel 20 operates in at least two distinct modes, a mutual capacitance mode and a self-capacitance mode.

In a self-capacitance mode, the touch screen controller 12 configures the sense circuitry 22 to sense the capacitance between any given column or row (e.g., a sense line 29 forming a node 13/equipotential nodes 13) and a surrounding panel reference (for example, ground). By sensing a change in self-capacitance for the given column or row, the sense circuitry 22 detects a user touch or hover at or near that given column or row. Advantageously, self-capacitance mode sensing provides better rejection of unwanted foreign matter, such as water, in contact with the multi-touch capacitive touch screen 14. Unfortunately, self-capacitance mode sensing is prone to a ghosting problem associated with a multi-touch situation because the entire length of the given column or row of the sense line 29 is used to sense (e.g., the entire sense line 29 forms a single node 13) and thus the sense circuitry 22 is not able to unambiguously distinguish between different touch/hover instances falling along a same row or column.

In a self-capacitance mode, the touch screen controller 12 directs the drive circuitry 24 to excite the drive array 26 with a waveform and repurpose the drive array 26 to serve a dual role also as a sense array 28, and/or may repurpose the sense circuitry 22 to further function as a drive circuitry 24, driving the sense array 28 with a waveform. The touch screen controller 12 monitors the amount of charge (or current) needed to substantially fully charge a capacitance disposed between one or more associated nodes 13 of the array and a circuit ground. The stored charge may discharge via a current directly coupled from the node 13 to a finger, stylus or other touch (and to a lesser degree, via fringe field coupling to adjacent nodes 13). A water droplet increases the fringe field strength, enhancing the capacitive coupling between the node 13 and adjacent nodes 13 of adjacent lines. However, because the adjacent nodes 13 of adjacent lines are much smaller current sinks than a finger, stylus or other touch, the effect of a water droplet is substantially less than that of a desired touch and may be filtered out as an error. Moreover, the effects of a water droplet may be even further diminished by driving the adjacent lines with a waveform similar or identical to that exciting the drive array 26, in this manner, substantially zeroing any potential difference between the node 13 and adjacent nodes 13 of the adjacent lines, and thus substantially zeroing any potential current flow via a fringe field between nodes 13.

In a mutual-capacitance mode, the touch screen controller 12 configures the sense circuitry 22 to sense the capacitance at an intersection point (node 13) between one column/row of a sense line 29 and one row/column of a drive line 27. Thus, each row or column is associated with multiple nodes 13 in a mutual-capacitance mode, whereas each row or column is associated with only a single node 13 in a self-capacitance mode. By sensing a change in mutual-capacitance at a given node 13 between a sense line 29 and a drive line 27, the sense circuitry 22 detects a user touch or hover at or near that given intersection point. Advantageously, mutual-capacitance mode sensing provides higher resolution for detecting the particular location of a user touch or hover, and enables the sense circuitry 22 to distinguish between and identify the locations of multi-touch/hover situations, including along the same row or column. Unfortunately, a mutual-capacitance mode is prone to falsely detecting unwanted foreign matter, such as water in contact with the multi-touch capacitive touch screen 14 as a touch, because the water also changes the mutual-capacitance at an affected node 13.

During a mutual capacitance mode, the touch screen controller 12 evaluates the capacitance existing between the drive array 26 and sense array 28 at each node 13 while directing the drive circuitry 24 to excite the drive array 26 with a waveform. The touch screen controller 12 directs the sense circuitry 22 to monitor the sense array 26 to quantify a signal coupled to the sense array 28 from the drive array 26. For instance, a fringe field may couple the sense array 28 to the drive array 26 at the location of each node 13. A finger, stylus, or other touch desired to be detected effectively steals charge from the node 13 by diverting current that would otherwise pass through the fringe field between the sense array 28 and drive array 26 to a current sink, such as ground. As such, a net reduction in mutual capacitance at the node 13 occurs. Furthermore, a water droplet increases the fringe field strength, enhancing the capacitive coupling between the sense array 28 and drive array 26 at the node 13 and increasing the flow of current through the fringe field between the sense array 28 and the drive array 26, introducing anomalies to the sensed waveform detected by the sense circuitry 22. One may appreciate that a water droplet increases coupling (and current transfer) and increases capacitance between the sense array 28 and drive array 26 at the node 13, while a touch steals charge from the node 13 and decreases the capacitance. As such, a touch and a water droplet are in some instances identifiable by their opposite effect on capacitance at each node 13. The effect of water may balance, or overpower the effect of a touch, causing detection errors.

While the mutual capacitance mode enables detection of multiple simultaneous touches along a same row or a same column, the self-capacitance mode enables the differentiation of finger or stylus touches from water droplets at the cost of being unable to resolve multiple simultaneous touches along a same row or a same column. The opposite advantages and disadvantages of self-capacitance mode and mutual-capacitance mode often lead the system designer to choose operation of the panel in one or the other mode based on whether the panel is being provided in an environment where water rejection is preferred or an environment where multi-touch detection (with accurate location resolution) is preferred. There is a need in the art for solutions which would enable a panel to enjoy the benefits of both self-capacitance mode and mutual-capacitance mode.

Figure 3:
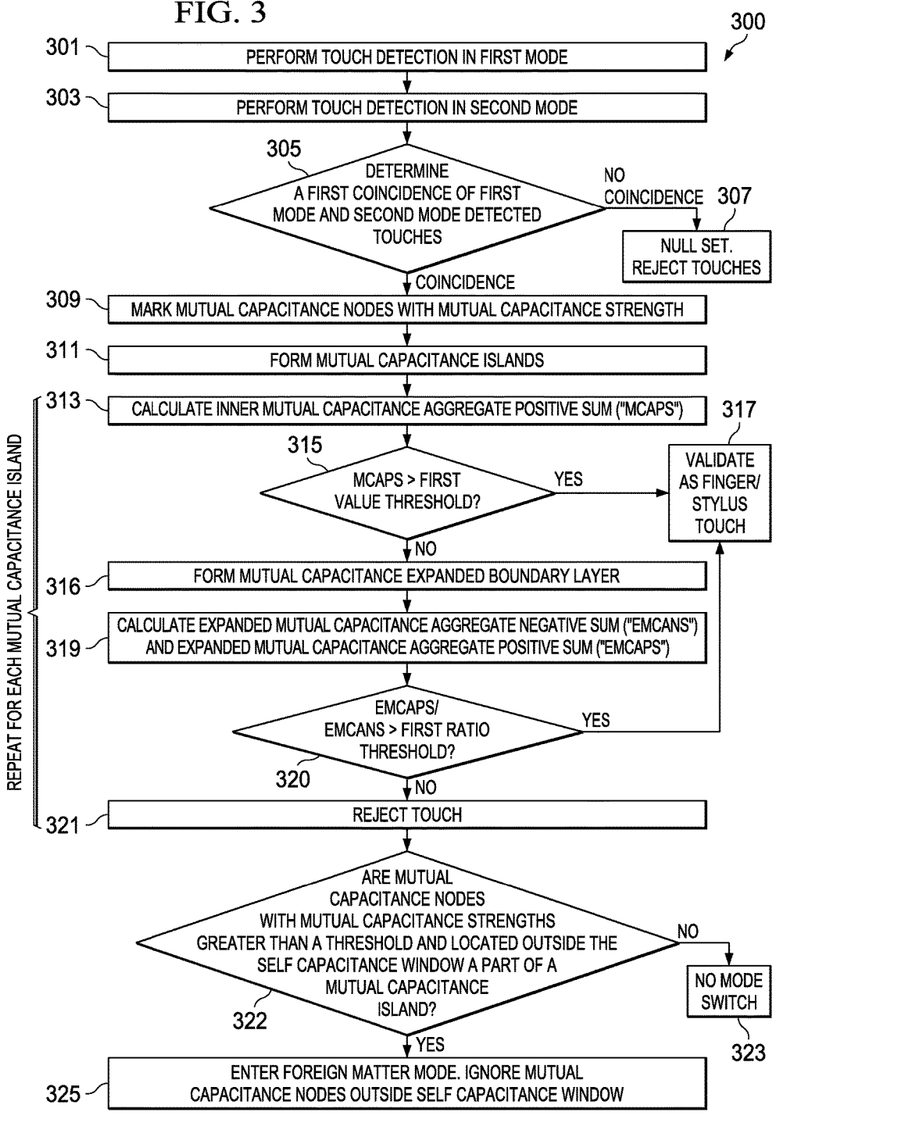
FIG. 3 illustrates a method for water rejection for the multi-touch capacitive touch screen, in accordance with various embodiments.

With reference to FIGS. 1-2, and further reference to FIG. 3, a method 300 for water rejection for a multi-touch capacitive touch screen is provided. A touch screen controller 12 directs a multi-touch capacitive touch screen 14 to perform touch detection in a first mode (step 301). For instance, a first mode comprises a mutual-capacitance mode or a self-capacitance mode. Subsequent to step 301, the touch screen controller 12 directs a multi-touch capacitive touch screen 14 to perform touch detection in a second mode (step 303). The second mode comprises a self-capacitance mode, or a mutual capacitance mode. In various embodiments, the first mode comprises a self-capacitance mode and the second mode comprises a mutual capacitance mode, and in further embodiments, the first mode comprises a mutual capacitance mode and the second mode comprises the self-capacitance mode.

The touch screen controller 12 then determines a first coincidence of first mode and second mode detected touches (step 305). For example, the touch screen controller 12 identifies each node 13 associated with a charge indicative of a touch ("touched nodes"). In the event that the touched nodes of the first mode (e.g., the nodes identified as being touched in step 301) fail to overlap with the touched nodes of the second mode (e.g., the nodes identified as being touched in step 303) then the first coincidence comprises a null set and a "no coincidence" state exists and all touches are rejected as erroneous (step 307). This is because it is expected that both mutual capacitance touched nodes and self-capacitance touched nodes will indicate a touch in the presence of a touch by a finger or stylus.

In response to at least one node 13 being commonly determined to be a touched node of the first mode and a touched node of the second mode, a "coincidence" state exists, and the method proceeds to step 309. More specifically, the touch screen controller 12 marks mutual capacitance strengths for nodes 13, including those outside a self-capacitance window (a window bounded by extrema characterized as a closed trapezoidal shape defined by the outermost self-capacitance touched nodes) (step 309). To "mark" means to associate in a computer memory, digital logic, or analog logic, a mutual capacitance node 13 with a mutual capacitance strength measured at that node 13. Each node 13 having a mutual capacitance strength greater than the first mutual capacitance strength detection threshold and lying adjacent to other mutual capacitance touched node(s) 13 having the mutual capacitance strength greater than the first mutual capacitance strength detection threshold is associated with a "mutual capacitance island." A mutual capacitance island is a collection of nodes 13, each node 13 both having, and adjacent to another node 13 also having, a mutual capacitance strength greater than a first mutual capacitance strength detection threshold. One or more mutual capacitance islands are formed (Step 311).

For each mutual capacitance island, the capacitance strength value of each node 13 indicating positive capacitance strength is summed ("inner mutual capacitance aggregate positive sum") (step 313). In response to the inner mutual capacitance aggregate positive sum exceeding a first value threshold (step 315), the touch that created the mutual capacitance island is validated as a finger or stylus touch, or other wanted touch (step 317). One should recall that it was previously determined that a coincidence state existed. As a result, the mutual capacitance island that is validated as a finger or stylus touch or other wanted touch necessarily lies at least partially within the self-capacitance window.

Generally, mutual capacitance islands will be made up of multiple touched nodes. These multiple touched nodes may extend beyond the boundaries of the self-capacitance island. Both the touched nodes inside the self-capacitance island, and the touched nodes outside the self-capacitance island are useful for calculations determining the precise and accurate location of the touch. For instance, the inclusion of touched nodes, even outside the self-capacitance window, improves the accuracy and precision of interpolation calculations that may operate to precisely and accurately locate the origin of the touch lying within the self-capacitance window.

However, if water or other foreign matter rests on the touch screen, certain nodes outside the self-capacitance window that otherwise would provide useful data instead provide incorrect, inaccurate, or otherwise corrupted data. The mutual capacitance strength of that node is corrupted by the presence of the foreign matter. Thus, if foreign matter is detected anywhere on the touch screen, the method takes steps to exclude the mutual capacitance nodes located outside the self-capacitance window (and thus susceptible to being caused by foreign matter) from calculations. As will be discussed shortly, the exclusionary steps (which may be performed on individual mutual capacitance islands, or which may be a separate mode of operation) are termed "foreign matter mode."

Each mutual capacitance island may also be surrounded by a mutual capacitance expanded boundary layer 53 (shown in FIG. 4B) enclosing the mutual capacitance island. A mutual capacitance expanded boundary layer 53 is a collection of nodes 13, each node 13 immediately adjacent to an edge of the mutual capacitance island (e.g., it forms a perimeter immediately outward of the mutual capacitance island that is one node deep). For a mutual capacitance island comprising a single node 13 located at the corner of the multi-touch capacitive touch screen 14, the mutual capacitance expanded boundary layer 53 may comprise as few as three nodes 13 immediately surrounding the mutual capacitance island. In various instances, the mutual capacitance expanded boundary layer 53 may include one or more node having a mutual capacitance strength less than a second mutual capacitance strength detection threshold. The second mutual capacitance strength detection threshold is in some embodiments zero, so that nodes with negative mutual capacitance strengths are identified. For instance, because foreign matter such as water causes increased node-to-node current coupling, whereas desired touches such as a finger steals current from the node, an opposite polarity may be indicated for foreign matter such as water. One or more mutual capacitance expanded boundary layer 53 is formed (step 316), each of which encircles one mutual capacitance node. In response to the inner mutual capacitance aggregate positive sum being less than a first value threshold, the touch screen controller 12 sums the negative values of the mutual capacitance island and the mutual capacitance expanded boundary layer surrounding the mutual capacitance island. This sum is the expanded mutual capacitance aggregate negative sum. The touch screen controller 12 also adds the positive values of the mutual capacitance expanded boundary layer to the inner mutual capacitance aggregate positive sum to form the expanded mutual capacitance aggregate positive sum (collectively, step 319).

The touch screen controller 12 further computes the ratio of the expanded mutual capacitance aggregate positive sum of a mutual capacitance island and expanded boundary layer to the expanded mutual capacitance aggregate negative sum of the mutual capacitance island and expanded boundary layer. This ratio is important, because as discussed previously, water drops tend to induce negative capacitance strengths whereas wanted touches from a finger or stylus tend to induce positive capacitance strengths. In response to the ratio being greater than a first ratio threshold (step 320), the touch that created the mutual capacitance island is validated as associated with a finger or stylus or other wanted touch (step 317), and thus is not excluded from use such as by further interpolation methods. Such may be the case in the event that a wet finger or stylus touches the touch screen, or a finger or stylus touches the touch screen at or near the same location as an existing water droplet.

On the other hand, in response to the ratio being less than a first ratio threshold (e.g., resulting from the excessive negative capacitance strength value arising from coupling of nodes 13 via a water droplet), the mutual capacitance island is not validated as a finger/stylus touch because it is associated with the presence of foreign matter, such as water (step 321). The touch screen controller 12 then determines whether to entre a "foreign matter mode." The touch screen controller 12 evaluates whether mutual capacitance nodes with mutual capacitance strength greater than the first mutual capacitance strength detection threshold and located outside the self-capacitance window are included as a portion of a mutual capacitance island (step 322). If a mutual capacitance island includes any mutual capacitance nodes with a mutual capacitance strength exceeding the first mutual capacitance strength detection threshold (as collected in step 309), and located outside the self-capacitance window, then the controller enters foreign matter mode, ignoring mutual capacitance nodes outside the self-capacitance window (step 325). Otherwise, no mode switch occurs (step 323).

During foreign matter mode, the inaccuracy or imprecision potentially caused by the mutual capacitance touched nodes with mutual capacitance values corrupted by the influence of foreign matter outweighs the desire to include mutual capacitance touched nodes outside the self-capacitance window in other calculations. Thus, in foreign matter mode, the matrix of the nodes 13 available for evaluation is limited to only those nodes bounded within the geometric extrema of the touched nodes of the self-capacitance mode. Stated differently, the method includes rejecting touched nodes that are positioned outside the boundaries of the self-capacitance window from any other calculations, such as one having ordinary experience in the art may appreciate may otherwise be implemented to precisely and accurately locate the origin of a touch. For instance, while a touch may be indicated by both mutual capacitance and self-capacitance modes, and the touch may have an origin within the self-capacitance window, ordinarily, mutual capacitance strengths of nodes outside the self-capacitance window may prove useful in accurately and precisely calculating the orientation of the touch within the self-capacitance window. However, in response to entry into foreign matter mode, these nodes outside the self-capacitance window will thereafter be ignored as corrupted by the influence of foreign matter which influenced the mutual-capacitance mode (but not the self-capacitance mode). As such, the corrupted nodes may be selectively filtered out. In this manner, many water droplets may be ignored, whereas, many desired touches such as by a particularly wet finger or stylus may continue to be detected. This narrowing of focus takes advantage of the tendency of self-capacitance mode to reject water droplets and yet further resolves the precise position of the touch by activating the mutual capacitance mode, but only for the region wherein the self-capacitance mode confirms a probable wanted touch. The method may then be repeated for subsequent touch detections.

Figure 4A:
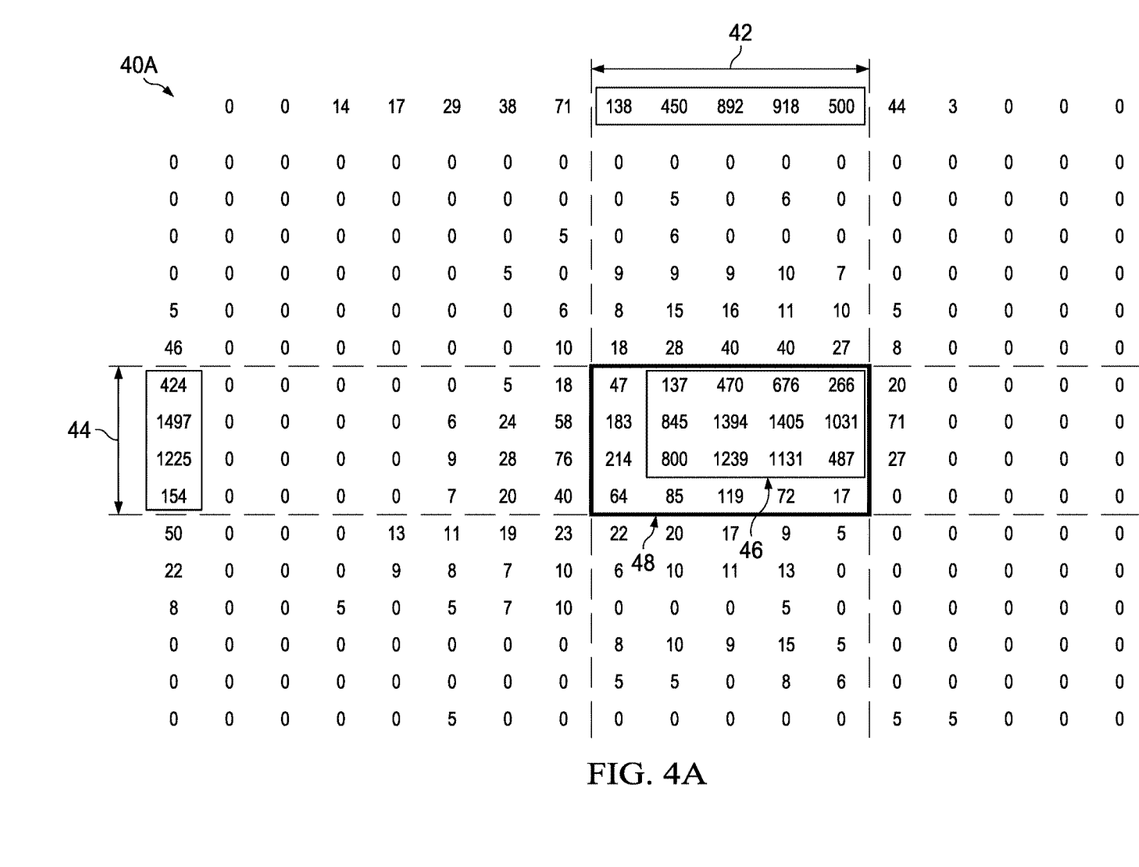
FIG. 4A illustrates a no-water touch detection scenario involving the method according to FIG. 3, in accordance with various embodiments.
Figure 4B:
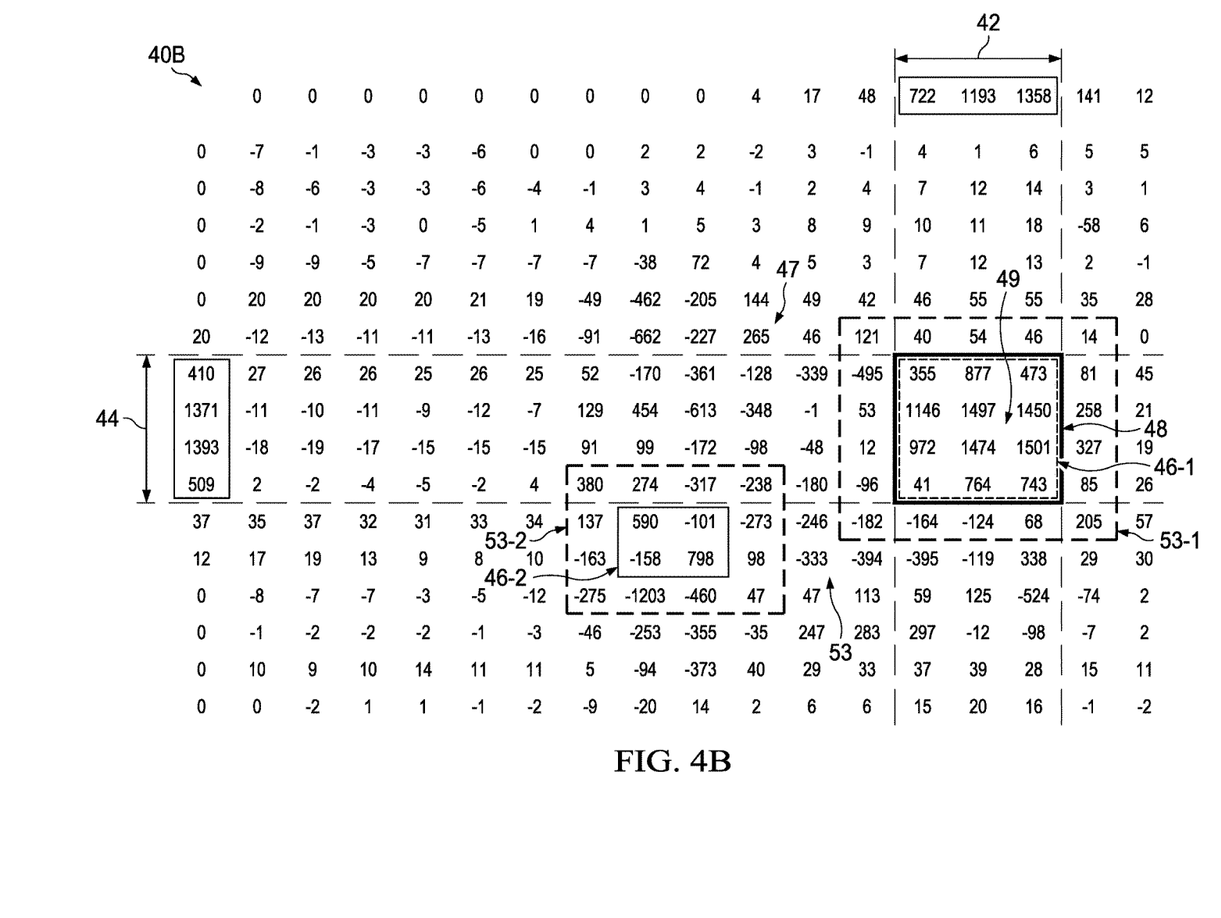
FIG. 4B illustrates a water rejection scenario involving the method according to FIG. 3, in accordance with various embodiments.

With reference to FIGS. 3 and 4A, a no-water touch detection scenario 40A is depicted. With reference to FIGS. 3 and 4B, a water rejection scenario 40B is depicted. In a no-water scenario 40A, no water droplets are on the touch screen. In a water scenario 40B, one or more water droplets rest on the touch screen. By considering FIGS. 3, 4A, and 4B together, a greater appreciation for various practical implementations of method 300 may be developed.

With reference to FIGS. 1-3, and further reference to FIG. 4A, a no-water touch detection scenario 40A is depicted. A touch screen controller 12 directs a multi-touch capacitive touch screen 14 to perform touch detection in a first mode (step 301). For instance, a first mode comprises a mutual-capacitance mode or a self-capacitance mode. Subsequent to step 301, the touch screen controller 12 directs a multi-touch capacitive touch screen 14 to perform touch detection in a second mode (step 303). The second mode comprises a self-capacitance mode, or a mutual capacitance mode.

The touch screen controller 12 determines a first coincidence of first mode and second mode detected touches (step 305). For example, the touch screen controller 12 identifies each node associated with a charge indicative of a touch ("touched nodes"). In the example of FIG. 4A, the touched nodes of the self-capacitance mode define a window bounded by a first self-capacitance node axis 42 and a second self-capacitance node axis 44. Because the self-capacitance mode implements a single node for each row/column, the window is bound by extrema characterized as the outermost touched nodes of each axis. These extrema map to a closed trapezoidal shape called a self-capacitance window 48.

Note also that the touched nodes of the mutual capacitance mode at least partially fall within the self-capacitance window 48. Thus, a "coincidence" state exists, and the method proceeds to step 309. More specifically, the touch screen controller 12 marks all mutual capacitance strengths for all nodes (step 309). These strengths are depicted as signed numerical scalar values in FIG. 4A. Each node adjacent to at least one other node of an adjacent row/column, both having a mutual capacitance strength with a value greater than a first mutual capacitance strength detection threshold is associated with a mutual capacitance island 46. A mutual capacitance island 46 is a collection of nodes, each node lying adjacent to a node of an adjacent row/column both with a mutual capacitance strength greater than a first mutual capacitance strength detection threshold. In this example, one mutual capacitance island 46 is formed. (Step 311). Notably, the mutual capacitance island 46 at least partially overlaps the self-capacitance window 48, as is expected for a coincidence state to exist. This is important, in part, because valid touches only arise within the self-capacitance window, but information from mutual capacitance strengths of mutual capacitance nodes outside the self-capacitance window 48 may be useful to other processes such as may be appreciated by one having ordinary skill in the art, for instance, interpolation calculations to accurately and precisely locate the origin of the touch within the self-capacitance window 48.

For each mutual capacitance island 46, the capacitance strength value of each node indicating a positive capacitance strength is summed ("inner mutual capacitance aggregate positive sum") (step 313). In response to the inner mutual capacitance aggregate positive sum exceeding a first aggregate sum threshold (step 315), the touch that created the mutual capacitance island 46 is validated as a finger or stylus, or other wanted touch (step 317). In this instance, the inner mutual capacitance aggregate positive sum exceeds a first aggregate sum threshold, indicating that the touch is validated as a finger or stylus. The touch lies within the mutual capacitance island 46 and the self-capacitance window 48 and is strongest at the four nodes with mutual capacitance values of 1394, 1405, 1239, and 1131. The precise location may be interpolated from the mutual capacitance strengths both within the self-capacitance window 48 and outside the self-capacitance window 48, though any origin of a valid touch will be located within the self-capacitance window 48.

With reference to FIGS. 1-3, and further reference to FIG. 4B, a water rejection scenario 40B is depicted. A touch screen controller 12 directs a multi-touch capacitive touch screen 14 to perform touch detection in a first mode (step 301). For instance, a first mode comprises a mutual-capacitance mode or a self-capacitance mode. Subsequent to step 301, the touch screen controller 12 directs a multi-touch capacitive touch screen 14 to perform touch detection in a second mode (step 303). The second mode comprises a self-capacitance mode, or a mutual capacitance mode.

The touch screen controller 12 determines a first coincidence of first mode and second mode detected touches (step 305). For example, the touch screen controller 12 identifies each node associated with a charge indicative of a touch ("touched nodes"). In the example of FIG. 4B, the touched nodes of the self-capacitance mode fall within a window 48 bounded by a first self-capacitance node axis 42 and a second self-capacitance node axis 44. Because self-capacitance mode implements a single node for each row/column, the window 48 is bound by extrema characterized as the outermost touched nodes of each axis. These extrema map to a closed trapezoidal shape called a self-capacitance window 48.

Because the touched nodes of the mutual capacitance mode at least partially fall within the self-capacitance window 48, a "coincidence" state exists, and the method proceeds to step 309. More specifically, the touch screen controller 12 marks all mutual capacitance strengths for nodes outside the self-capacitance window (step 309).

Each node adjacent to at least one other node of an adjacent row or column, both having a mutual capacitance strength with a value greater than a first mutual capacitance strength detection threshold is associated with a mutual capacitance island 46. These strengths are depicted as signed numerical scalar values in FIG. 4B. A mutual capacitance island 46 is a collection of nodes, each node adjacent to a node of an adjacent row or column, both with a mutual capacitance strength greater than a first mutual capacitance strength detection threshold. In this example, a first mutual capacitance island 46-1 is formed coincident with the self-capacitance window 48 and a second mutual capacitance island 46-2 is formed outside of the self-capacitance window 48 (Step 311). The first mutual capacitance island 46-1 may be associated with a first mutual capacitance expanded boundary layer 53-1 and the second mutual capacitance island 46-2 may be associated with a second mutual capacitance expanded boundary layer 53-2. Valid touches will all fall within both the self-capacitance window 48 and a mutual capacitance island, thus the second mutual capacitance island 46-2 is clearly not a valid touch, and it may potentially indicate the presence of foreign matter, such as water.

For each mutual capacitance island 46-1, 46-2, the capacitance strength value of each node indicating a positive capacitance strength is summed ("inner mutual capacitance aggregate positive sum") (step 313). In response to the mutual capacitance inner aggregate positive sum exceeding a first aggregate sum threshold (step 315), the touch that created the mutual capacitance island is validated as a finger or stylus, or other wanted touch (step 317). In this instance, the inner mutual capacitance aggregate positive sum for the first mutual capacitance island 46-1 exceeds a first aggregate sum threshold, indicating that the touch is validated as a finger or stylus. However, the inner mutual capacitance aggregate positive sum for the second mutual capacitance island 46-2 does not exceed a first aggregate sum threshold, so that assessment of the second mutual capacitance island 46-2 must continue in step 316. While its position outside the self-capacitance window 48 eliminates the possibility that it is a valid touch by a finger or stylus, its remains unknown what potential may exist to corrupt other measurements one having ordinary skill in the art may want to perform, such as making use of mutual capacitance strengths.

Thus, in response to the inner mutual capacitance aggregate positive sum of the second mutual capacitance island 46-2 being less than a first aggregate sum threshold, a mutual capacitance expanded boundary layer 53-2 is determined adjacent to an edge of the second mutual capacitance island 46-2. A mutual capacitance expanded boundary layer 53 is a collection of nodes, each node immediately adjacent to an edge of the mutual capacitance island (e.g., it forms a perimeter immediately outward of the mutual capacitance island that is one node deep). In various instances, the mutual capacitance expanded boundary layer 53-2 may include one or more node having a mutual capacitance strength less than a second mutual capacitance strength detection threshold. The second mutual capacitance strength detection threshold is in some embodiments zero, so that negative mutual capacitance strengths are included. For instance, because foreign matter such as water causes increased node-to-node current coupling, whereas desired touches such as a finger steals current from the node, an opposite polarity may be indicated for foreign matter such as water. In this example, a mutual capacitance expanded boundary layer 53-2 is formed surrounding the second mutual capacitance island 46-2, and a mutual capacitance expanded boundary layer 53-1 is similarly formed surrounding the first mutual capacitance island 46-1 (step 316).

The touch screen controller 12 further sums the negative values of the second mutual capacitance island 46-2 and the second mutual capacitance expanded boundary layer 53-2 adjacent to the second mutual capacitance island 46-2. This sum is the expanded mutual capacitance aggregate negative sum. The touch screen controller 12 also adds the positive values of the mutual capacitance expanded boundary layer to the inner mutual capacitance aggregate positive sum to form the expanded mutual capacitance aggregate positive sum (collectively, step 319).

The touch screen controller 12 computes the ratio of the expanded mutual capacitance aggregate positive sum of the second mutual capacitance island 46-2 and expanded boundary layer 53-2 to the expanded mutual capacitance aggregate negative sum of the second mutual capacitance island 46-2 and the second mutual capacitance expanded boundary layer 53-2 (step 320). This ratio is important, because as discussed previously, water drops tend to induce negative capacitance strengths whereas wanted touches from a finger or stylus tend to induce positive capacitance strengths.

In response to the ratio being less than a first ratio threshold (step 320), the touch that created the second mutual capacitance island 46-2 is determined to be created by foreign matter on the touch screen, such as water. Thus, the touch screen controller 12 rejects the touch that created the second mutual capacitance island 46-2 (step 321). Since the second mutual capacitance island 46-2 includes mutual capacitance nodes with mutual capacitance strengths greater than a first mutual capacitance strength detection threshold from step 309, and at least a portion of such nodes are outside the self-capacitance window (step 322), the touch screen controller enters a "foreign matter mode" (step 325).

The effect of foreign matter mode is better understood with the following example. While the touched nodes of the self-capacitance mode are dispersed across the touch screen in a defined self-capacitance window 48, other nodes identified during the mutual capacitance mode, such as outlier node 47, are outside the self-capacitance window 48, but with a relatively high capacitance strength. Subsequent interpolations seeking to accurately and precisely locate the origin of the touch associated with the first mutual capacitance island 46-1 and the self-capacitance window 48 might make use of outlier node 47 in a calculation; however, because the touch screen controller 12 has entered foreign matter mode (step 325), all nodes outside the self-capacitance window 48, including outlier node 47, are ignored, because their mutual capacitance values are potentially corrupted by the influence of foreign matter, such as water. The precise positioning of the touch at focal node 49 may be determined by subsequent interpolations in view of the mutual capacitance nodes within the self-capacitance window 48 while outlier node 47 and all other nodes outside self-capacitance window 48, including those of second mutual capacitance island 46-2, are ignored.

An advantage of the disclosed implementation is that the design supports multiple finger touch detection (using the mutual capacitance sensing mode) and water droplet rejection (using the self-capacitance sensing mode). Thus, the design enables provision of very fine multi-touch accuracy and linearity owing to the mutual sensing operation as well as operation in hostile and mobile environments that might defeat ordinary systems and methods for using mutual capacitance strengths to interpolate or otherwise resolve touch origin, especially when touches lie between nodes or mutual capacitance strengths are distributed asymmetrically. While sequential operation of mutual sensing and self-sensing modes is discussed for brevity, one may appreciate that a plurality of sense arrays and/or drive arrays may be so arranged as to permit simultaneous operation of a touch screen in both modes.

The foregoing description has provided by way of exemplary and non-limiting examples a full and informative description of one or more exemplary embodiments of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A method of foreign matter rejection for a capacitive touch screen comprising:
   performing touch detection in a mutual capacitance mode to identify mutual capacitance touched nodes;
   creating a first mutual capacitance island comprising adjacent mutual capacitance touched nodes that have mutual capacitance strengths greater than a first mutual capacitance strength detection threshold;
   creating a first mutual capacitance expanded boundary layer comprising at least one mutual capacitance touched node that has a mutual capacitance strength less than a second mutual capacitance strength detection threshold;
   calculating an inner mutual capacitance aggregate positive sum comprising a sum of the mutual capacitance strengths of the first mutual capacitance island that are greater than zero;
   in response to the inner mutual capacitance aggregate positive sum not exceeding a first aggregate sum threshold, performing steps comprising:
      calculating an expanded mutual capacitance aggregate positive sum comprising a sum of the inner mutual capacitance aggregate positive sum and every mutual capacitance strength of the first mutual capacitance expanded boundary layer that is greater than zero;
      calculating an expanded mutual capacitance aggregate negative sum comprising a sum of each mutual capacitance strength of the mutual capacitance touched nodes of the first mutual capacitance expanded boundary layer that is less than zero and each mutual capacitance strength of each mutual capacitance touched node of the first mutual capacitance island that is less than zero;
      computing a ratio of the expanded mutual capacitance aggregate positive sum to the expanded mutual capacitance aggregate negative sum; and
      rejecting the first mutual capacitance island as not being a valid touch in response to the ratio being less than a first ratio threshold.

2. The method according to claim 1, further comprising performing touch detection in a self-capacitance mode to identify self-capacitance touched nodes.

3. The method according to claim 2, further comprising:
   forming a self-capacitance window bounded by a first self-capacitance node axis and a second self-capacitance node axis characterized by outermost self-capacitance touched nodes along each axis.

4. The method according to claim 3, further comprising entering a foreign matter mode in response to the first mutual capacitance island comprising at least one mutual capacitance touched node positioned outside of the self-capacitance window.

5. A method of foreign matter rejection for multi-touch capacitive touch screens comprising:
   performing touch detection in a self-capacitance mode, wherein self-capacitance mode touched nodes are identified and a self-capacitance window bounded by a first self-capacitance node axis and a second self-capacitance node axis characterized by outermost self-capacitance mode touched nodes along each axis is formed;
   performing touch detection in a mutual capacitance mode, wherein mutual capacitance touched nodes are identified;
   determining a first coincidence of mutual capacitance mode touched nodes and self-capacitance mode touched nodes;
   in response to the first coincidence not comprising a null set, performing steps comprising:
      forming a first mutual capacitance island comprising a plurality of mutual capacitance touch nodes, each of the plurality of mutual capacitance touch nodes of the first mutual capacitance island being adjacent to another mutual capacitance touch node of the first mutual capacitance island, each of the plurality of mutual capacitance touch nodes of the first mutual capacitance island having a mutual capacitance strength greater than a first mutual capacitance strength detection threshold, each of the plurality of mutual capacitance touch nodes of the first mutual capacitance island being positioned outside the self-capacitance window; and
      forming a second mutual capacitance island comprising adjacent capacitance touched nodes having mutual capacitance strengths greater than the first mutual capacitance strength detection threshold and positioned inside the self-capacitance window.

6. The method according to claim 5, further comprising in response to the first coincidence not comprising a null set, validating a touch that created the second mutual capacitance island as caused by at least one of a finger or stylus in response to a sum of the mutual capacitance strengths of each node of the second mutual capacitance island that is greater than zero within the self-capacitance window exceeding a first aggregate sum threshold.

7. A method of foreign matter rejection for a capacitive touch screen comprising:
   performing touch detection in a first mode selected from a first set comprising a mutual capacitance mode and a self-capacitance mode;
   performing touch detection in a second mode selected from the first set and different from the first mode;
   determining a first coincidence of mutual capacitance mode touched nodes detected in the mutual capacitance mode and self-capacitance mode touched nodes detected in the self-capacitance mode;

in response to the first coincidence not comprising a null set, performing steps comprising:

determining a mutual capacitance strength of each mutual capacitance mode touched node;

creating a mutual capacitance island comprising adjacent mutual capacitance touched nodes having mutual capacitance strengths greater than a first mutual capacitance strength detection threshold;

creating a mutual capacitance expanded boundary layer comprising mutual capacitance touched nodes adjacent to an edge of the mutual capacitance island and having mutual capacitance strengths less than a second mutual capacitance strength detection threshold;

calculating an inner mutual capacitance aggregate positive sum comprising a sum of the mutual capacitance strengths of mutual capacitance touched nodes of the mutual capacitance island that are greater than zero;

in response to the inner mutual capacitance aggregate positive sum not exceeding a first aggregate sum threshold:

(i) calculating an expanded mutual capacitance aggregate negative sum comprising a sum of the mutual capacitance strengths of mutual capacitance touched nodes of the mutual capacitance expanded boundary layer that are less than zero and the mutual capacitance strengths of the mutual capacitance touched nodes of the mutual capacitance island that are less than zero; and (ii) calculating an expanded mutual capacitance aggregate positive sum comprising a sum of the inner mutual capacitance aggregate positive sum and every mutual capacitance strength of the mutual capacitance expanded boundary layer that is greater than zero;

calculating a ratio of the expanded mutual capacitance aggregate positive sum to the expanded mutual capacitance aggregate negative sum;

in response to the ratio being less than a first ratio threshold, rejecting the mutual capacitance island as a foreign matter touch; and entering a foreign matter mode in response to the mutual capacitance island including the mutual capacitance touched node outside a self-capacitance window and with the mutual capacitance strength greater than the first mutual capacitance strength detection threshold.

8. The method according to claim 7, wherein determining the first coincidence comprises determining that at least one mutual capacitance mode touched node falls within a self-capacitance window of the self-capacitance mode bounded by a first self-capacitance node axis and a second self-capacitance node axis characterized by outermost self-capacitance touched nodes along each axis.

9. The method according to claim 7, further comprising in response to the first coincidence comprising a null set, rejecting all touches as erroneous.

10. The method according to claim 7, further comprising in response to the first coincidence not comprising a null set, performing steps further comprising validating a touch that created the mutual capacitance island as at least one of a finger or stylus in response to the inner mutual capacitance aggregate positive sum exceeding a first aggregate sum threshold.

11. The method according to claim 7, wherein performing touch detection in the self-capacitance mode comprises identifying the self-capacitance window.

12. The method of claim 11, wherein entering a foreign matter mode comprises rejecting all mutual capacitance mode touched nodes positioned outside boundaries of the self-capacitance window.

13. The method according to claim 12, wherein the self-capacitance window is bounded by a first self-capacitance node axis and a second self-capacitance node axis characterized by outermost self-capacitance touched nodes along each axis.

14. A method of foreign matter rejection for multi-touch capacitive touch screens comprising:

performing touch detection in a self-capacitance mode, wherein self-capacitance mode touched nodes are identified and a self-capacitance window bounded by a first self-capacitance node axis and a second self-capacitance node axis characterized by outermost self-capacitance mode touched nodes along each axis is formed;

performing touch detection in a mutual capacitance mode, wherein mutual capacitance touched nodes are identified;

determining a first coincidence of mutual capacitance mode touched nodes and self-capacitance mode touched nodes;

in response to the first coincidence not comprising a null set, performing steps comprising:

forming a first mutual capacitance island comprising adjacent mutual capacitance touched nodes having mutual capacitance strengths greater than a first mutual capacitance strength detection threshold and positioned outside the self-capacitance window;

forming a second mutual capacitance island comprising adjacent capacitance touched nodes having mutual capacitance strengths greater than the first mutual capacitance strength detection threshold and positioned inside the self-capacitance window;

creating a first mutual capacitance expanded boundary layer comprising mutual capacitance touched nodes that form a perimeter of one node depth immediately outward of the first mutual capacitance island;

calculating a first inner mutual capacitance aggregate positive sum comprising a sum of each mutual capacitance strength of the first mutual capacitance island that is greater than zero;

in response to the first inner mutual capacitance aggregate positive sum not exceeding a first aggregate sum threshold, calculating a first expanded mutual capacitance aggregate positive sum comprising a sum of the first inner mutual capacitance aggregate positive sum and each mutual capacitance strength of the first mutual capacitance expanded boundary layer that is greater than zero; and calculating a first expanded mutual capacitance aggregate negative sum comprising a sum of each mutual capacitance strength of each mutual capacitance touched node of the first mutual capacitance expanded boundary layer that is less than zero and each mutual capacitance strength of each mutual capacitance touched node of the first mutual capacitance island that is less than zero.

15. The method according to claim 14, further comprising in response to the first coincidence not comprising a null set, validating a touch that created the second mutual capacitance island as caused by at least one of a finger or stylus in response to the sum of the mutual capacitance strengths of each node of the second mutual capacitance island that is greater than zero within the self-capacitance window exceeding a first aggregate sum threshold.

16. The method according to claim 14, further comprising in response the first coincidence not comprising a null set, calculating a ratio of the first expanded mutual capacitance aggregate positive sum to the first expanded mutual capacitance aggregate negative sum.

17. The method according to claim 16, further comprising in response the first coincidence not comprising a null set, rejecting the first mutual capacitance island in response to the ratio being less than a first ratio threshold.

18. The method according to claim 17, further comprising in response to rejecting the first mutual capacitance island, entering a foreign matter mode in response to the first mutual capacitance island comprising mutual capacitance nodes having mutual capacitance strengths greater than the first mutual capacitance strength detection threshold and lying outside the self-capacitance window.

19. The method according to claim 18, wherein entering the foreign matter mode comprises rejecting all mutual capacitance mode touched nodes positioned outside boundaries of the self-capacitance window.

\* \* \* \* \*

UNITED STATES PATENT AND TRADEMARK OFFICE
CERTIFICATE OF CORRECTION

PATENT NO. : 10,365,764 B2
APPLICATION NO. : 15/207105
DATED : July 30, 2019
INVENTOR(S) : Lokesh Kumar Korapati et al.

Page 1 of 1

It is certified that error appears in the above-identified patent and that said Letters Patent is hereby corrected as shown below:

In the Specification

At Column 5, Line number 67, please replace the reference [[ 26 ]] with -- 28 --.

Signed and Sealed this
Fourteenth Day of April, 2020

Andrei Iancu
*Director of the United States Patent and Trademark Office*